(12) United States Patent
Kopke

(10) Patent No.: US 6,442,452 B1
(45) Date of Patent: Aug. 27, 2002

(54) CONTROL APPARATUS FOR CARRYING OUT SWITCHING OPERATIONS IN A SWITCHGEAR ASSEMBLY

(75) Inventor: Volker Kopke, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/407,259

(22) Filed: Sep. 27, 1999

Related U.S. Application Data

(63) Continuation of application No. PCT/DE98/00773, filed on Mar. 16, 1998.

(30) Foreign Application Priority Data

Mar. 27, 1997 (DE) .......................................... 197 13 119

(51) Int. Cl.$^7$ .......................... G05B 9/02; G05B 11/01; H02H 3/00
(52) U.S. Cl. .......................... 700/292; 700/22; 700/23; 700/79; 361/3
(58) Field of Search .............................. 700/22, 23, 79, 700/292; 361/3, 144

(56) References Cited

U.S. PATENT DOCUMENTS

| | | |
|---|---|---|
| 5,233,511 A | 8/1993 | Bilas et al. |
| 5,357,573 A * | 10/1994 | Walters ...................... 713/193 |
| 5,490,086 A * | 2/1996 | Leone et al. ................. 700/292 |
| 5,720,012 A * | 2/1998 | McVeigh et al. .......... 358/1.14 |
| 5,909,180 A * | 6/1999 | Bailey et al. ................ 340/639 |

FOREIGN PATENT DOCUMENTS

EP 0 716 491 A1 6/1996

OTHER PUBLICATIONS

Japanese Patent Abstracts No. 03124225 (Sachio), dated May 27, 1991.
Japanese Patent Abstracts No. 06195101 (Mitsuhiro), dated Jul. 15, 1994.
"Schaltfehlerschutz 8TK", switching mistake protection, Siemens Publication, 1985, Order No. A19100–E135–B283.

* cited by examiner

Primary Examiner—Leo Picard
Assistant Examiner—Elliot Frank
(74) Attorney, Agent, or Firm—Laurence A. Greenberg; Werner H. Stemer; Gregory L. Maybeck

(57) ABSTRACT

Switching operations in a switchgear assembly, in particular a medium-voltage switchgear assembly, are carried out via a control apparatus. The control apparatus has an electronic memory card for variable storage of control data which automatically initiate the switching operation or each switching operation. The control process then takes place exclusively via the memory card. The memory card is inserted into a card reader in the switchgear assembly. After this, an automatic sequence of the desired switching operations takes place using a switching program stored in advance in the memory card.

8 Claims, 1 Drawing Sheet

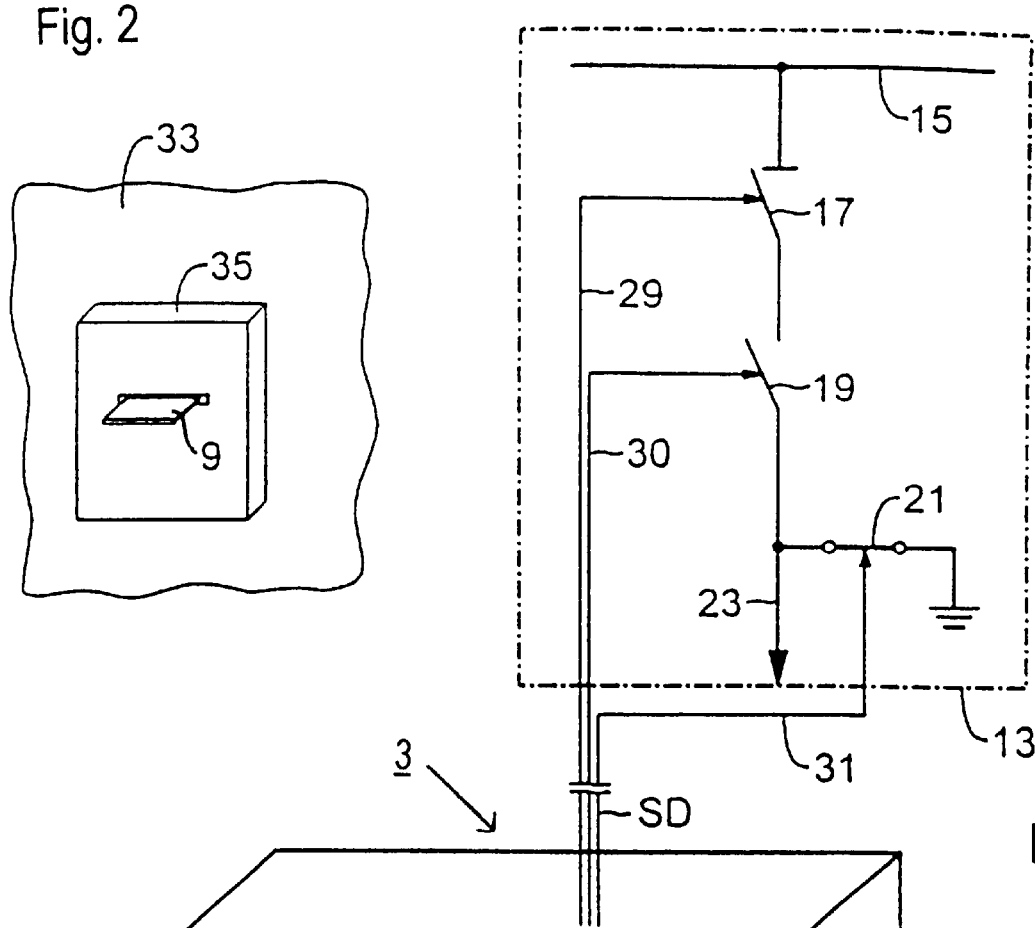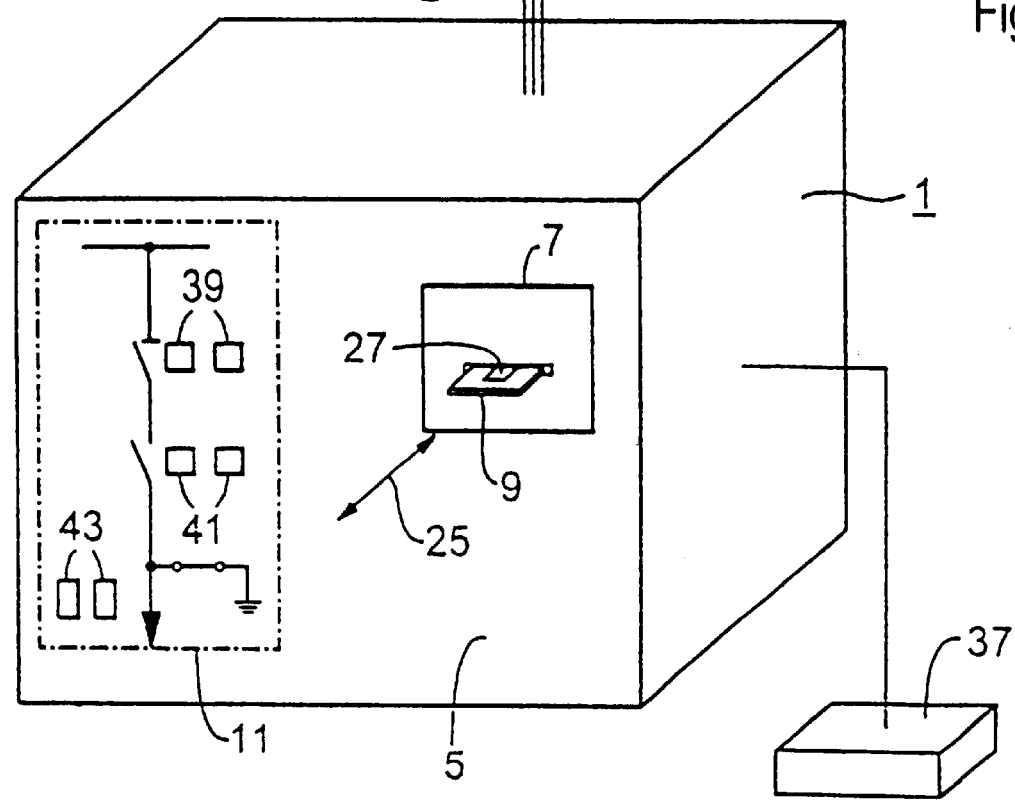

CONTROL APPARATUS FOR CARRYING OUT SWITCHING OPERATIONS IN A SWITCHGEAR ASSEMBLY

CROSS-REFERENCE TO RELATED APPLICATION

This is a continuation of copending International Application PCT/DE98/00773, filed Mar. 16, 1998, which designated the United States.

BACKGROUND OF THE INVENTION

FIELD OF THE INVENTION

The invention lies in the field of electrical engineering. More specifically, the invention relates to a control apparatus for carrying out switching operations in a switchgear assembly, in particular in a high-voltage or medium-voltage installation.

Switching operations are repeatedly necessary in switchgear assemblies in a power supply network for selectively supplying or disconnecting electrical assemblies. Switching operations must thereby be carried out to a different extent, owing to the large number of functions integrated in modern switchgear assemblies. One such switching operation is, for example, the connection or disconnection of a circuit-breaker, with corresponding connection or disconnection of voltage to or from an electrical equipment. Another switching operation is the opening or closing of a switch-disconnector, with corresponding production or closing of an isolating gap required for safety reasons. Furthermore, a switching operation may be the connection or disconnection of a grounding switch, with corresponding grounding and short-circuiting of a power supply section, for example for process-technical reasons.

It is absolutely necessary during the operation of such a switchgear assembly, that the switching operations be carried out in a specific sequence. The sequence of switching operations is referred to in the art as a switching program. The extent of such a switching program may differ and may comprise, for example, only the switching of the circuit-breaker, of the switch-disconnector, of the grounding switch, or a combination of these switching operations. The isolating and grounding function are thereby subject to particular conditions, on the basis of which isolation and non-energized grounding may be carried out only without power. Various interlock systems between the functions are used to guarantee that these conditions are satisfied at all times.

In order to allow medium-voltage switchgear assemblies to be operated, the German Standard (DIN VDE, IEC) requires that operators be trained to become authorized switchgear operators, who may therefore carry out these switching operations. The respective operating states are monitored by a mechanic or a secondary technician, who identifies the switch positions and generates an appropriate message. In this case, the switching operations may be carried out manually, locally, or by remote control, the grounding normally being carried out locally. Control errors when carrying out switching operations manually can result in severe injuries to personnel and damage to equipment.

Japanese Patent Abstract JP 06 195 101 (JP Applic. 04343013) discloses a control apparatus for controlling a device in a system having a magnetic memory card. The memory card is used to store control information and system control information, by means of which, in general, an enable signal and a control signal can be produced for the device.

U.S. Pat. No. 5,233,511 to Bilas et al. discloses a system for remote control of interrupters for interrupting an electrical power supply temporally during peak-load periods and for programmable lighting monitoring for industrial sites, that is to say in a low-voltage network. The system has a key card mechanism with an automatic interpreter, by means of which a coded message incorporated on a key card can be interpreted. If required, this allows an operator to have access to monitor the interrupter. The key card mechanism is used to prevent unauthorized access to system programming functions. The coded message is stored on the coded key card in the form of a hole pattern which is detected optically in a card reader.

The Siemens company prospectus "Schaltfehlerschutz 8TK" [Switching Fault Protection 8TK], 1985, Order No. A-19100-E135-B283 discloses a so-called switching fault protective device for high-voltage and medium-voltage systems, which is used, inter alia, for manual control of switchgear. There, the reliability of switching operations carried out manually is monitored in accordance with interlock conditions which can be specified in advance. In principle, the interlock conditions may be rendered ineffective via various control buttons. In order to authorize the operation of the switching fault protective device, appropriate key-operated switches may be provided, which enable the operation of the device on the basis of switching authorization.

SUMMARY OF THE INVENTION

It is accordingly an object of the invention to provide a control apparatus for carrying out switching operations with a switchgear assembly, which overcomes the above-mentioned disadvantages of the heretofore-known devices and methods of this general type and which affords a particularly high level of reliability and automation.

With the foregoing and other objects in view there is provided, in accordance with the invention, in combination with a high-voltage or medium-voltage switchgear assembly having a plurality of controlled devices such as a power breaker, a switch disconnector, and/or a grounding switch disposed in a switch panel of the assembly, a control apparatus for controlling the controlled devices, comprising:

an electronic memory card adapted to store operating authorization for the switchgear assembly and to store system control information defining a switching program with a number of control data items representing a sequence of switching operations;

the control data items automatically producing control signals for initiating at least one switching operation within the switch panel for at least one of the controlled devices.

The use of such a memory card or switching card allows the execution of the switching programs to be initiated, monitored and appropriately documented virtually without any faults, and thus particularly safely, automatically. At the same time, the switching card can carry out the function of authorization control. Switching operations independently of authorization control may therefore be carried out only by the holder of the memory card. This results in standardization of the design of the interlock technology.

In accordance with an added feature of the invention, the memory card includes a memory from which the control data items can be read. The control data items represent a sequence of switching operations. In order to read out the control data for the switch or each switch in the switchgear assembly, the memory card can expediently be inserted in a card reader which is provided in a control interface of the switchgear assembly, and a plurality of control interfaces with associated card readers may also be provided. The switching operations are then executed by sending the stored control data via control lines which lead to the switches in the switchgear assembly and are connected to the card reader. The control data then initiate, for example, auxiliary voltages for the respective switching process. At the same time, each switching operation carried out may be indicated on the control panel by visualization of the respective switch position.

In accordance with an additional feature of the invention, there is provided an output device, such as a printer, for recording each switching operation carried out using the memory card.

In accordance with another feature of the invention, the memory card is programmable. To this end, a switching program with a specific sequence of switching operations can be written to the memory card. The stored switching program can be overwritten with a new switching program, by reprogramming. The essential feature in this case is the programming of the respective switching operation to be carried out such as, in particular, the switching of a circuit breaker, of a switch-disconnector and/or of an grounding switch, in a specific sequence. Any required combinations of individual switching operations may be programmed in this case. Further information items, in particular coding of assemblies or system sections allocated to the system, a specific date and/or a specific time, may be programmed in the memory card as additional stored data.

In accordance with a further feature of the invention, the memory card is further adapted to store thereon access authorization to the switchgear assembly. In that case, a door opener code for the switchgear assembly door is stored in the memory card, as additional information. The programming process is carried out by automatically writing to the memory card by means of a computer, and is ended with the switching program required for the respective purpose.

The invention may also be summarized as an improved control apparatus for controlling a system device via a memory card adapted to store control information and system control information, and to cause an enable signal and a control signal to be produced for the device. The improvement comprises the following:

- the system is a high-voltage or medium-voltage switchgear assembly having, if necessary, further devices;
- the system devices are a plurality of devices such as a power
- breaker, a switch disconnector, and/or a grounding switch arranged in a switch panel in the system;
- the memory card is an electronic memory card;
- the control information stored on the memory card represents operating authorization;
- the system control information stored on the memory card forms a switching program with a number of control data items representing a sequence of switching operations; and
- control signals for initiating at least one switching operation in the switch panel are automatically produced for at least one of the devices using the control data.

The advantages achieved by the invention are, in particular, that the use of an electronic memory card for variable storage of control data which automatically initiate the switching operation or each switching operation ensures that the control process is simplified with, at the same time, a particularly low time and labor cost and a high level of safety. Incorrect control operations are in consequence virtually precluded. Furthermore, a high level of standardization as well as high speed in the control sequences are achieved even over relatively long distances, with standard and reliable documentation of the switching processes (responsibility) also being possible.

Other features which are considered as characteristic for the invention are set forth in the appended claims.

Although the invention is illustrated and described herein as embodied in a control apparatus for carrying out switching operations in a switchgear assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

FIG. 1 is a schematic diagram of a control apparatus with an electronic memory card for carrying out switching operations in a switchgear assembly; and FIG. 2 is a partial perspective view of a switchgear assembly access door with an access authorization reader and an inserted access card.

DESCRIPTION OF THE PREFERRED EMBODIMENT

Referring now to the figures of the drawing in detail and first, particularly, to FIG. 1 thereof, there is seen a control apparatus 1 for a switchgear assembly 3, for example a medium-voltage switchgear assembly, contains (in a control interface 5) a card reader 7 which receives and reads an electronic memory card 9, and a control panel 11 which symbolizes a switching panel 13 of the switchgear assembly 3. A plurality of control interfaces, with corresponding card readers, may also be provided in the switchgear assembly 3.

The switching panel 13 is composed of a switch disconnector 17, connected to a busbar 15, and a circuit-breaker 19, connected downstream from the switch-disconnector 17. There is also provided a grounding switch 21. The circuit-breaker 19 and the grounding switch 21 lead to an output or outgoer 23 from the switchgear assembly 3 for non-illustrated electrical assemblies in a power supply network.

In order to monitor the operational state of the switchgear assembly 3, the control panel 11 of the control interface 5 indicates the positions of the switches 17 to 21. In the illustrated switch positions, work may be carried out on an assembly connected to the outgoer 23. To do this, the circuit-breaker 19 is first of all switched to the illustrated "OFF" position, and the voltage to the equipment or to the assembly is interrupted. The switch-disconnector 17 is then opened, i.e., placed in its OFF position, to produce an isolating gap required for safety reasons. In addition, for technical reasons, a particular section including the assembly is shortcircuited and grounded by closing the switch 21, i.e., by switching the grounding switch 21 to its ON position.

The switchgear assembly 3 is controlled by means of the electronic memory card 9. For that purpose, the memory card 9 is inserted into the card reader 7 in an insertion direction 25. The desired switching operations are then carried out in an automated sequence. Appropriate control data SD are read from a memory 27 in the memory card 9 and are passed, in the form of auxiliary voltages, via control lines 29, 30 and 31 to the respective switches 17, 19, and 21, respectively. The switching operations are carried out as a sequence in a specific, predetermined order, on the basis of a switching program stored in the memory card 9. The memory card is programmed with such a switching program, that is to say with a specific sequence of switching operations, in a manner which is not illustrated in more detail, by means of a computer or a computer system. The same memory card 9 may be used for programming various switching programs by writing new control data SD to the memory 27 in the memory cards 9.

In a further feature of the invention, the memory card 9 is expediently also used as an ID for access authorization to the switchgear assembly 3. This is done by providing a further card reader 35 close to or in the vicinity of a switchgear assembly door 33, only part of which is illustrated in FIG. 2.

The program stored in the memory card 9 then has added to it, as appropriate, a door opener code for the switchgear assembly door 33.

An output device in the form of a printer 37 connected to the control interface 5 is used to record all the switching operations carried out, starting, for example, with entry to the switchgear assembly 3 and ending on leaving the area for carrying out the switching operations.

Thus, in order to carry out the switching operations in the switchgear assembly 3, only a single, programmable electronic memory card 9 is required, for variable storage of control data SD which automatically initiate the switching operation or each switching operation. All control operations are then carried out via the memory card 9, by inserting it into the card reader 7 in the switchgear assembly 3. After this, the desired switching operations are carried out in an automatic sequence, on the basis of a switching program which has previously been stored in the memory card 9.

The automatic sequence, which is carried out on insertion of the memory card 9 into the card reader 7, of the switching operations programmed into the memory card 9 may be monitored on the control panel 11, with each switching operation carried out being visualized. Since the memory card expediently in each case contains only one specific switching program, and other switching operations are therefore impossible, incorrect control operations are virtually precluded. In the event of a defect in the automatic control sequence, control buttons 39, 41, and 43 are additionally provided on the control panel 11. The control buttons 39, 41, and 43 connect or disconnect the respective switch 17, 19, or 21 mechanically.

I claim:

1. In combination with a high-voltage or medium-voltage switchgear assembly having a plurality of controlled devices selected from the group consisting of a power breaker, a switch disconnector, and a grounding switch disposed in a switch panel of the assembly, a control apparatus for controlling the controlled devices, comprising:

an electronic memory card having stored thereon operating authorization for the switchgear assembly and to store system control information defining a switching program with a plurality of control data items representing a sequence of switching operations;

the control data items automatically producing control signals for initiating at least one switching operation within the switch panel for at least one of the controlled devices.

2. The control apparatus according to claim 1, wherein said memory card includes a memory from which the control data items can be read.

3. The control apparatus according to claim 1, which further comprises a control interface of the switchgear assembly and a card reader in said control interface for receiving said memory card and for reading out the control data for at least one switch, and a control line connecting said card reader to the switches of the switchgear assembly.

4. The control apparatus according to claim 1, which further comprises a control panel adapted to display each switching operation carried out in the system visualization of a respective switch position.

5. The control apparatus according to claim 1, which further comprises an output device for recording each switching operation carried out using said memory card.

6. The control apparatus according to claim 1, wherein said memory card is programmable with a sequence of switching operations.

7. The control apparatus according to claim 1, wherein said memory card is further adapted to store thereon access authorization to the switchgear assembly.

8. An improved control apparatus for controlling a system device via a memory card having control information and system control information stored thereon, and to cause an enable signal and a control signal to be produced for the device, the improvement which comprises:

the system being a high-voltage or medium-voltage switchgear assembly having, if necessary, further devices;

the system devices being a plurality of devices selected from the group consisting of power breaker, switch disconnector, and grounding switch arranged in a switch panel in the system;

the memory card being electronic memory card;

the control information stored on the memory card representing operating authorization;

the system control information stored on the memory card forming a switching program with a plurality of control data items representing a sequence of switching operations; and wherein control signals for initiating at least one switching operation in the switch panel are automatically producible for at least one device using the control data.

* * * * *